(12) United States Patent
Morales et al.

(10) Patent No.: US 12,155,610 B2
(45) Date of Patent: Nov. 26, 2024

(54) MESSAGING OMNI-CHANNEL AUTHENTICATION

(71) Applicant: Salesforce, Inc., San Francisco, CA (US)

(72) Inventors: Jonathan Rico Morales, Dublin, CA (US); Orjan Kjellberg, Walnut Creek, CA (US)

(73) Assignee: Salesforce, Inc., San Francisco, CA (US)

(*) Notice: Subject to any disclaimer, the term of this patent is extended or adjusted under 35 U.S.C. 154(b) by 122 days.

(21) Appl. No.: 17/661,610

(22) Filed: May 2, 2022

(65) Prior Publication Data

US 2023/0353517 A1 Nov. 2, 2023

(51) Int. Cl.
*H04L 51/046* (2022.01)
*H04L 9/40* (2022.01)

(52) U.S. Cl.
CPC ........ *H04L 51/046* (2013.01); *H04L 63/0428* (2013.01); *H04L 63/0807* (2013.01); *H04L 63/108* (2013.01)

(58) Field of Classification Search
CPC ............... H04L 51/046; H04L 63/0428; H04L 63/0807; H04L 63/108
See application file for complete search history.

(56) References Cited

U.S. PATENT DOCUMENTS

| | | |
|---|---|---|
| 2005/0125541 A1 | 6/2005 | Frank et al. |
| 2010/0332665 A1 | 12/2010 | Jolfaei |
| 2016/0380932 A1* | 12/2016 | Barak ...................... H04W 4/14 715/752 |
| 2022/0086133 A1* | 3/2022 | Killoran, Jr. ............ H04L 51/18 |
| 2023/0092487 A1* | 3/2023 | Kalbasi ................. H04W 4/027 455/411 |

* cited by examiner

*Primary Examiner* — Bryan Y Lee
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed that relate to authenticating users across different messaging channels. A computer system may implement a messaging platform that enables a messaging session to be established between an agent and a user that uses any of a plurality of messaging channels to communicate with the agent during the messaging session. The computer system may provide a configurable authorization request component that enables the agent to authenticate the user independent of a messaging channel used by the user. Based on receiving an indication that the configurable authorization request component has been selected by the agent via an interface displayed to the agent for communicating with the user, the computer system may communicate with a channel system associated with the messaging channel of the user to authenticate the user.

20 Claims, 8 Drawing Sheets

MESSAGING OMNI-CHANNEL AUTHENTICATION

BACKGROUND

Technical Field

This disclosure relates generally to computer systems and, more specifically, to various mechanisms for authenticating users across different messaging channels.

Description of the Related Art

Companies usually provide avenues to users that enable them to contact the companies in order to receive assistance for a particular matter. For example, some companies use Apple Messages for Business™ that enables a customer to start a conversation with a company. Consequently, when a user seeks assistance from that company, the user can use iMessage® on their iPhone to start a conversation in which the user texts messages with the company. That company may employ an individual or a robot to reside on the other side of the conversation and interact with the user. Other example avenues include Short Message Service (SMS), WhatsApp™, Google Business Messages, etc. These different avenues of contact often provide different capabilities for enriching the conversation between the user and the company. For example, one avenue of contact might enable videos to be sent and received within a conversation while another avenue does not provide this capability.

DETAILED DESCRIPTION

Figure 1:
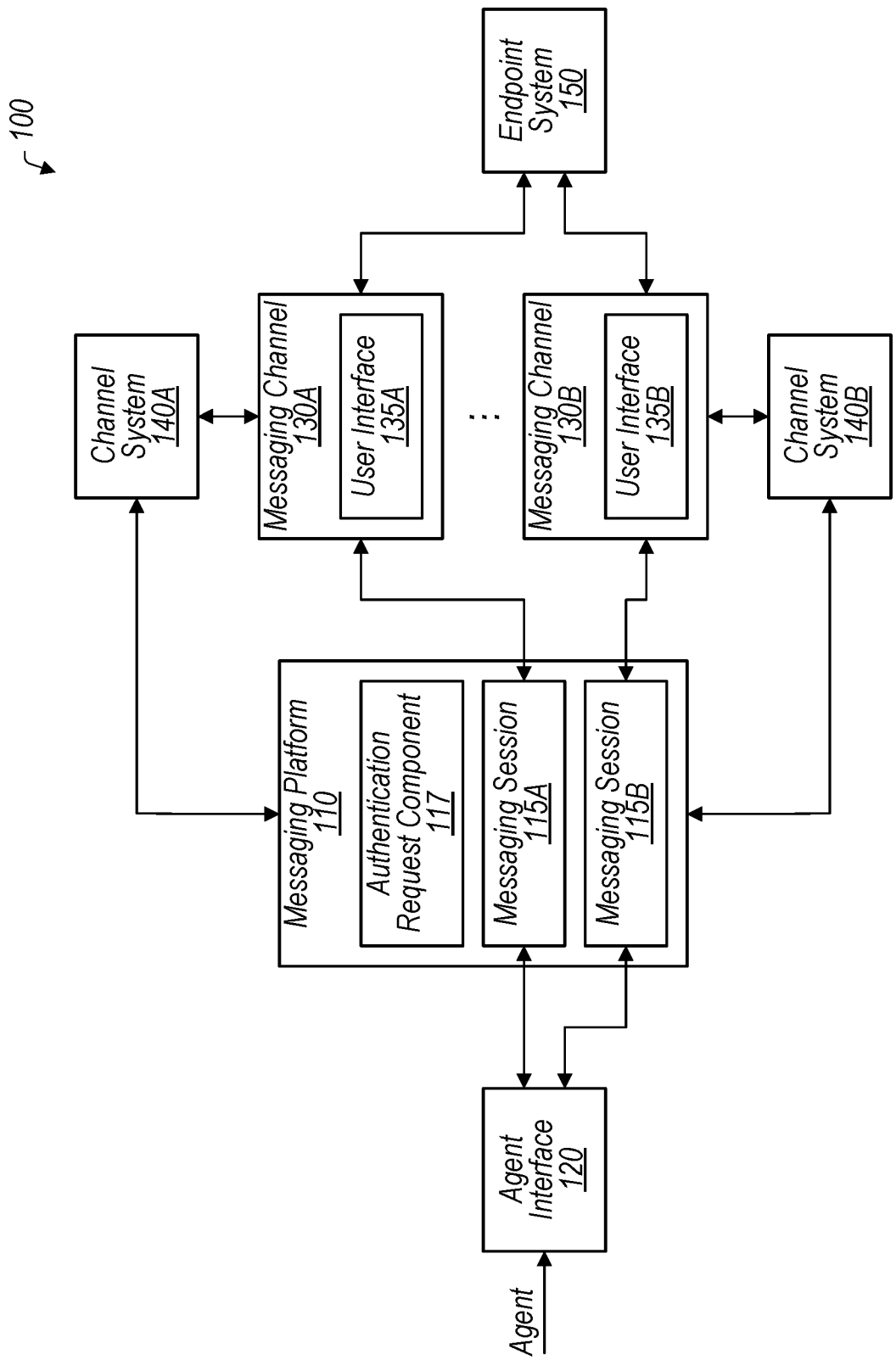
FIG. 1 is a block diagram illustrating example elements of a system that can authenticate a user during a messaging session, according to some embodiments.

Users often communicate with companies to receive assistance. To communicate with a company, a user may utilize a messaging channel through which the user can send and receive messages. As used herein, the phrase "messaging channel" is used in accordance with its well-understood meaning and refers to a communication medium/protocol that enables two or more systems to communicate by sending and receiving messages via that communication medium. Examples of messaging channels include, but are not limited to, Apple Messages for Business™, SMS, WhatsApp™, and Google Business Messages. This disclosure describes a messaging platform that enables a messaging session to be established between an agent and a user who may utilize any one of a plurality of different messaging channels to communicate with that agent. As used herein, the term "agent" refers to an individual or a robot that interacts with users on behalf of a company. For example, the messaging platform may present a user interface to an individual who acts as an agent for a company by sending and receiving messages via that interface.

During a messaging session between an agent and a user, it may be desirable to verify the user's identity before providing certain services (e.g., before providing access to company records about that user). In various cases, underlying a messaging channel is a channel system, such as the Apple platform, that provides a set of capabilities for enhancing the communicative experience of a user. For example, the Apple platform may enable a company to send an Apple Maps prompt as a message to the user. Different channel systems, however, provide different capabilities and even different implementations of the same capability. As a result, interfacing with these different channel systems to implement an authentication mechanism to authenticate a user can be tedious and time consuming due to their differences. As explained, this disclosure discusses a messaging platform that enables a company/agent to interact with a user. It may be desirable to enable, via the messaging platform, a company/agent to authenticate a user without that company having to worry about the different implementations of the messaging channels (and the underlying channel systems) used by the user. This disclosure addresses, among other issues, the technical problem of how to implement a universal authentication mechanism across different messaging channels that have different capabilities.

The present disclosure describes techniques for implementing a normalized schema for representing an authentication request across different messaging channels and an architecture for handling authentication requests and responses. In various embodiments that are described below, a system includes a messaging platform, a set of messaging channels and corresponding channel systems, and an endpoint system. The messaging platform provides an authentication request component that enables an agent to authenticate a user independent of the messaging channel used by the user to communicate with the agent during a messaging session. In various embodiments, the authentication request component is configurable by a tenant of the system (e.g., a company) to define a location of the endpoint system where authentication of a user is to occur. During a messaging session between an agent of the tenant and a user, the agent may be presented with an interface having that authentication request component to be sent to the end user. The agent may select the authentication request component to cause the messaging platform to interact with a channel system in order to route an authentication request to the user via the messaging channel associated with that channel system and utilized by the user. That authentication request routes the user to the endpoint system for authentication. Once that user has authenticated, the channel system may return an authentication payload to the messaging platform. In various cases, the authentication payload returned by one channel system is different than the payload returned by another channel system. Consequently, the messaging platform may convert the received authentication payload into a normalized payload. As a part of configuring the authentication request component, in various embodiments, the tenant can define logic for processing a result of the authentication request. Accordingly, the messaging platform may deliver the normalized payload to the tenant's logic for postliminary processing. Since the tenant is provided the same payload independent of the messaging channel utilized by the user, the tenant is able to define the authentication logic only once.

In some embodiments, a data model is implemented that enables an agent to understand if a user has authenticated and provides access to certain authentication details. As an example, a record may be maintained that indicates the authentication level of a user (e.g., authenticated) and its expiration date. Based on the authentication logic implemented by the tenant, a user might transition from an initial level (e.g., unidentified) through a set of levels (e.g., verified) to an end level (e.g., authenticated). As that record is updated, the interface presented to the agent may also be updated to reflect the current authentication level. Once the agent determines that the user has been authenticated, the agent may provide greater access to certain services.

These techniques may be advantageous as they permit an authentication mechanism to be implemented across different messaging channels with different capabilities. For example, two channel systems associated with respective messaging channels may return authentication tokens to the messaging platform, but one of the channel systems encrypts the token while the other channel system does not. The messaging platform can decrypt the encrypted token before returning that token to a tenant so that, in both cases, the tenant receives an unencrypted token independent of the messaging channel that is used. Because responses from different channel systems are normalized into a common response format, the tenant can define logic to process that common response format without worrying about the payload formats that are used by the different channel systems. That is, a tenant does not have to define different logic for different payload formats in order to use the capabilities of different messaging channels. Furthermore, by implementing a data model to track the progress of an authentication request, an agent can be made aware of whether a user has authenticated and the current state of that authentication, such as when it is scheduled to expire. An exemplary application of these techniques will now be discussed, starting with reference to FIG. 1.

Turning now to FIG. 1, a block diagram of a system 100 is shown. System 100 includes a set of components that may be implemented via hardware or a combination of hardware and software routines. In the illustrated embodiment, system 100 includes a messaging platform 110, messaging channels 130A-B associated with respective channel systems 140A-B, and an endpoint system 150. As shown, messaging platform 110 includes messaging sessions 115A-B and an authentication request component 117, and messaging channels 130A-B include user interfaces 135A-B, respectively. As further shown, an agent interacts with messaging sessions 115A-B through an agent interface 120. In various embodiments, system 100 is implemented differently than shown. For example, system 100 may include multiple endpoint systems 150, multiple agents, multiple configured authentication request components 117 (e.g., they identify different endpoint systems 150), etc.

Messaging platform 110, in various embodiments, implements a platform service (e.g., a customer relationship management (CRM) platform service) that allows users of that service to develop, run, and manage applications. In some embodiments, messaging platform 110 is a multi-tenant system that provides various functionality to users that are hosted by that multi-tenant system. As such, messaging platform 110 may execute software routines from various, different users (e.g., providers and tenants of messaging platform 110) as well as provide code, web pages, and other data to users, databases, and entities (e.g., a third-party system) associated with messaging platform 110. In some embodiments, messaging platform 110 is implemented using a cloud infrastructure provided by a cloud provider. For example, a server that provides agent interface 120 (e.g., to a device of an agent) may execute in a virtual environment hosted on server-based hardware that is included within a datacenter of the cloud provider.

In various embodiments, messaging platform 110 maintains a database that stores data for one or more of the tenants that are hosted by messaging platform 110. The data may include records about users (e.g., customers) of a tenant and their interactions and relationships to that tenant. As an example, records might be stored in association with a tenant that define a user's profile and one or more services or products provided to the user by that tenant. Consequently, in various embodiments, the data stored for a tenant about its users may be used to enhance the tenant's interactions with those users (and other individuals who may not have an account with the tenant). For example, during a messaging session 115 between a user and an agent of the tenant, the agent may access records of the user that allow for that agent to provide assistance to the user. In some embodiments, messaging platform 110 can access records from an external database that is operated under another domain or by another entity and use those records when interacting with a user during a messaging session 115.

A messaging session 115, in various embodiments, is an instance of a session between two or more entities in which messages are exchanged. A messaging session 115 may include a collection of records that are linked to the messaging session 115 (e.g., via a session identifier included within those records). For example, as discussed in greater detail with respect to FIG. 4, a record can be created for a messaging session 115 that identifies the authentication status of the user involved in that messaging session 115. The types of records created in association with one messaging session 115 might be different than the types of records created for another messaging session 115 (e.g., if an authentication request is not issued, then there would be no authentication request record linked to the messaging session 115). In some embodiments, the records that are created for a user during a first messaging session 115 can be used in a second, subsequent messaging session 115 with that same user.

In various embodiments, a messaging session 115 is established in response to a user sending a message to a tenant via a user interface 135 or an agent of a tenant sending a message to a user via agent interface 120. As illustrated, a messaging session 115 can be associated with a messaging channel 130 via which a user communicates with an agent. The type of messaging channel 130 that is associated with a messaging session 115 may depend on the user interface 135 selected by a user. For example, if a user sends a message using an Apple device, then the established messaging session 115 is associated with the Apple system. But if the user sends a message through SMS, then the established messaging session 115 is associated with the SMS protocol. In some cases, a user may be able to switch between messaging channels 130 within the same messaging session 115. For example, a user may start with SMS on their phone and then switch to Google Business Messages on their laptop.

Agent interface 120, in various embodiments, is an interface presented to an agent that allows for the agent to interact with users on behalf of a tenant associated with the agent. Agent interface 120 may be presented to an agent in response to request from the agent. For example, an agent may access messaging platform 110 through a web browser on their device and select an option on a web page that is presented to the agent to request agent interface 120. Messaging platform 110 may provide agent interface 120 to the agent's device, where it is rendered to that agent. The agent may either initiate a messaging session 115 via agent interface 120 or receive an indication via agent interface 120 that a message session 115 has been or will be established with a user. For example, a user may send, via a messaging channel 130, a message to a tenant that causes a messaging session 115 to be established. As a part of establishing that messaging session 115, an indication may be routed (e.g., by messaging platform 110) to an agent, where it is rendered via agent interface 120 (e.g., a chat box is opened, a message is presented to open that chat box, etc.). When a messaging session 115 is established, in various embodiments, an agent is presented with a set of selectable components that can be selected by the agent to affect the messaging session 115. One of those selectable components includes authentication request component 117.

Authentication request component 117, in various embodiments, is a module/unit that allows an agent/tenant to authenticate a user independent of the messaging channel 130 used by that user. Authentication request component 117 may be configured by the tenant (e.g., an admin of the tenant) and subsequently selected by the agent during a messaging session 115. As a part of configuring authentication request component 117, in some embodiments, a tenant defines an authentication endpoint (e.g., endpoint system 150) where authentication is to occur and may provide reusable verification logic for validating a user's authentication. Accordingly, during a messaging session 115, an agent may select authentication request component 117 (via agent interface 120) to cause messaging platform 110 to send an authentication request to the user via their messaging channel 130. The user may interact with the authentication request (via their user interface 135) to be redirected to the authentication endpoint where the user may attempt to be authenticated. An authentication response may be returned to messaging platform 110 and then processed by the verification logic (if it was provided by the tenant) before a result is presented to the agent. An example authentication request component 117 is discussed in greater detail with respect to FIG. 2.

A messaging channel 130, in various embodiments, is a communication medium that enables two or more systems to communicate by sending and receiving messages through that communication medium. Examples of messaging channels 130 include, but are not limited to, Apple Messages for Business™, SMS, and WhatsApp™. In various embodiments, messaging channels 130 are each associated with a respective user interface 135 through which a user can send and receive messages via the corresponding messaging channel 130. That user interface 135 may be designed by a provider of the associated messaging channel 130 and therefore different user interfaces 135 may provide different functionality. For example, messaging channel 130A may correspond to Apple Messages for Business™ and, as a result, user interface 135A may correspond to the iMessage® interface while messaging channel 130B may correspond to Facebook's business platform and thus user interface 135B may correspond to the WhatsApp™ interface. In various embodiments, a messaging channel 130 is supported by a channel system 140.

A channel system 140, in various embodiments, is a system that facilitates the operation of a corresponding messaging channel 130. For example, a channel system 140 may be one or more servers that facilitate the transfer of messages between a user device having user interface 135 and another external system. As such, when an agent sends a message to a user, messaging platform 110 may make an application programming interface (API) call to the correct channel system 140 to route the message to the user. When the user sends a response, the response may be routed through the channel system 140 to messaging platform 110 and then to the agent via agent interface 120. In various embodiments, a channel system 140 may also provide additional functionality (via an API) for enhancing the associated messaging channel 130. For example, a channel system 140 may allow for images and videos to be sent.

Endpoint system 150, in various embodiments, is a computer system that is capable of authenticating users (e.g., based on passwords, biometrics, etc.). Endpoint system 150 may be operated by a tenant of messaging platform 110 and accessed as part of assisting a user during a messaging session 115. In many cases, before providing a service to a user, the tenant verifies that the user is registered with the tenant. Accordingly, the tenant may configure authentication request component 117 to route the user to their endpoint system 150, where authentication of the user can occur. Once the user has authenticated, in various embodiments, endpoint system 150 returns an authentication response to messaging platform 110 that includes a token. Based on the token, the agent of the tenant may determine that the user is authenticated with the tenant and thus may provide records of the tenant to the user (e.g., records linked to the user's account with the tenant) or other services.

Figure 2:
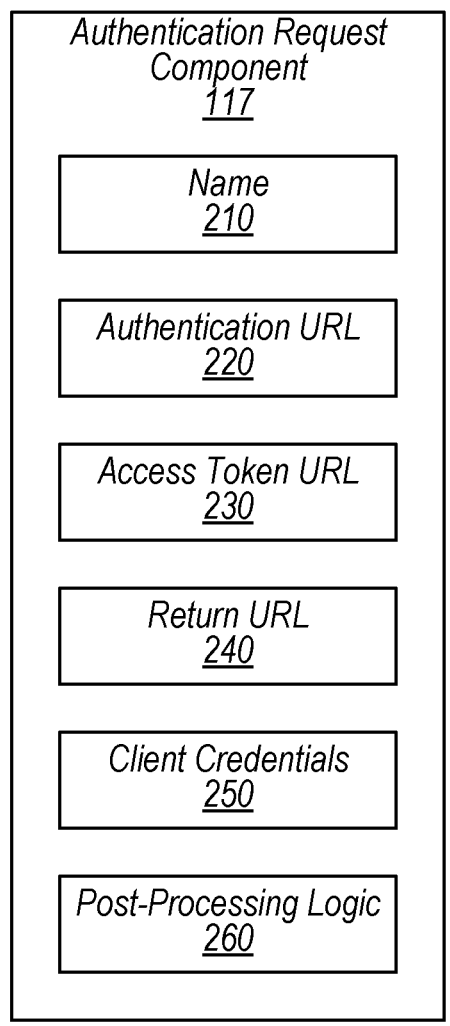
FIG. 2 is a block diagram illustrating example elements of an authentication request component, according to some embodiments

Turning now to FIG. 2, a block diagram of an authentication request component 117 is shown. In the illustrated embodiment, authentication request component 117 includes a name 210, an authentication uniform resource locator (URL) 220, an access token URL 230, a return URL 240, a set of client credentials 250, and post-processing logic 260. In some embodiments, authentication request component 117 is implemented differently than shown. As an example, component 117 may not include post-processing logic 260, it may include other values (e.g., a scope, an error URL, etc.), etc.

As explained, authentication request component 117 may be configured by a tenant of system 100 (e.g., a company) to define information about where the authentication of a user is to occur. The tenant may thus provide values for the various illustrated elements. Accordingly, the tenant may provide a name 210 for authentication request component 117 that is helpful to an agent or that tenant. For example, the tenant may specify a name 210 that is indicative of a name assigned to endpoint system 150. Consequently, name 210 may be used to differentiate between two authentication request components 117 that are associated with different endpoint systems 150.

Authentication URL 220, in various embodiments, is a URL to an authentication unit of endpoint system 150 that handles the authentication of the user. Accordingly, when the user selects an authentication request presented via a user interface 135, the user's device is directed to the authentication unit specified by authentication URL 220, which may be included in that authentication request. The user may provide authentication credentials (e.g., a username and a password) to the authentication unit and an authentication code may be returned to the user's device in response to a successful authentication. In various embodiments, the authentication code is redeemable for an access token that grants access to the one or more requested resources of the user.

Access token URL 230, in various embodiments, is a URL to a token unit of endpoint system that provides the access token. Accordingly, in response to obtaining the authentication code, a request (with the code) may be issued to the token unit for the access token. In various cases, the system that sends the authentication code to the token unit is different than the user's device. As discussed in greater detail with respect to FIG. 3A-B for example, the authentication code returned to the user's device may be provided by that user's device to the channel system 140 associated with the messaging session 115. That channel system 140 may then request the access token from the token unit of endpoint system 150. While the process for authentication is described as involving an authentication unit and a token unit, in some embodiments, those units are implemented by a single unit associated with a single URL. Furthermore, in response to a successful authentication at endpoint system 150, an access token may be returned instead of an authentication code that is redeemable for the access token.

Return URL 240, in various embodiments, is a URL to messaging platform 110 where the access token may be provided. Accordingly, in response to obtaining the access token, the channel system 140 (or the user's device) may provide the access token to messaging platform 110 via return URL 240. In some embodiments, the tenant configurating authentication request component 117 does not provide return URL 240. Instead, return URL 240 may be predefined by a provider of messaging platform 110.

Client credentials 250, in various embodiments, are credentials that have been assigned to a client application (e.g., an application executing on messaging platform 110 that provides one or more services of messaging platform 110) by endpoint system 150. For example, client credentials 250 may be a client ID and a client secret created and provided by endpoint system 150 at the registration of the client application. In some embodiments, the tenant configurating authentication request component 117 does not provide client credentials 250. Instead, client credentials 250 may be supplied by the provider of messaging platform 110 who has previously registered with endpoint system 150.

Post-processing logic 260, in various embodiments, is software routines executable to process a result that is returned by endpoint system 150 as part of an authentication request. In particular, when a malicious user is directed to endpoint system 150, the user may authenticate using an account that is different than the account associated with the user being impersonated by that malicious user. The endpoint system 150 may respond that the malicious user has been authenticated and provide a result. To prevent that malicious user's authentication under their own account from deceiving messaging platform 110, post-processing logic 260 may validate the authentication in order to ensure the user linked to a messaging session 115 is the user that was authenticated at endpoint system 150. In some embodiments, post-processing logic 260 is executed to perform other tasks, such as storing a record of the number of times that a user has authenticated.

Figure 3A:
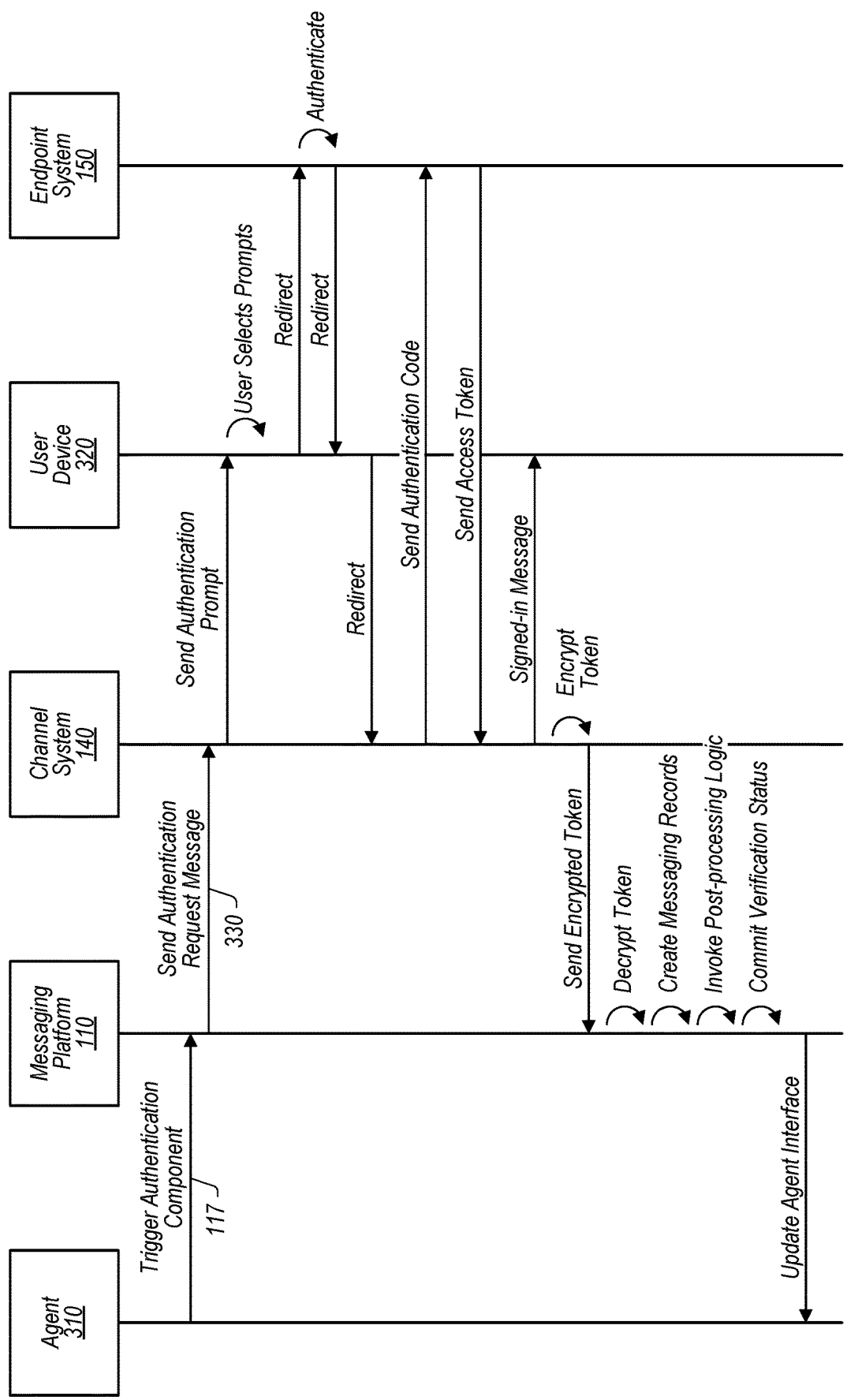
FIGS. 3A-C are block diagrams illustrating authentication flows for different messaging channels used by a user for messaging sessions, according to some embodiments.

Turning now to FIG. 3A, a block diagram of an example authentication flow is shown. In the illustrated embodiment, there is an agent 310, messaging platform 110, a channel system 140, a user device 320, and an endpoint system 150. While not illustrated, user device 320 may implement a portion of the messaging channel 130 (e.g., Apple Messages for Business™) and the user interface 135 (e.g., iMessage®) that are associated with the channel system 140 (e.g., Apple's system). The authentication flow may be implemented differently than shown, as discussed in FIGS. 3B and 3C.

Before the authentication flow is implemented, a messaging session 115 is established between agent 310 and a user of user device 320. During the messaging session 115, agent 310 may trigger authentication component 117 by selecting it via agent interface 120, which causes an authentication message to be sent to messaging platform 110. In response to that message, messaging platform 110 may access a definition of authentication component 117 and compile an authentication request message 330. In some embodiments, authentication request message 330 is compiled into a native payload that can be understood by channel system 140 and can cause channel system 140 to send an authentication prompt to the appropriate user device 320, as shown. For example, Apple's system may cause a selectable authentication prompt bubble element to be presented to a user via iMessage®. The user may then select that authentication prompt to be redirected to endpoint system 150 (e.g., a web browser or a specific UI may be opened and used to load a login webpage, which may be identified by authentication URL 220) for authentication.

After attempting to authenticate at endpoint system 150, user device 320 is redirect to channel system 140 such that a response is provided by endpoint system 150 to channel system 140. If the user did not authenticate successfully, then that response may indicate that the user did not authenticate successfully or include an error message. Channel system 140 may return that response to messaging platform 110. But if that user authenticated successfully, then the response from endpoint system 150 may include an authentication code that is redeemable for an access token. Accordingly, channel system 140 (or messaging platform 110, in some cases) provides the authentication code to endpoint system 150 and then receives the access token in response. In some embodiments, endpoint system 150 provides the access token when the user is authenticated instead of providing an authentication code. After obtaining the access token, channel system 140 sends a signed-in message to user device 320 to let the user know that they have signed in and encrypts the access token using an encryption key that was included within authentication request message 330 provided by messaging platform 110. After encrypting the access token, channel system 140 issues, to messaging platform 110, a response that includes the encrypted access token.

Subsequent to receiving the response from channel system 140, in some embodiments, messaging platform 110 converts that response into a common format such that differences in responses received from different channel systems 140 are masked. In the authentication flow of the illustrated embodiment, messaging platform 110 decrypts the encrypted access token as a part of converting the response into the common format. The encrypted access token may be decrypted using a private key generated by messaging platform 110—the public key being the encryption key provided to channel system 140. In addition to converting the response into the common format, messaging platform 110 creates a set of messaging records that are linked to the messaging session 115. For example, messaging platform 110 may create an authentication record specifying an authentication status of the user and an authentication details record that includes the access token. Those records are discussed in greater detail with respect to FIG.

4. After creating those records, messaging platform 110 may cause the records to be presented to agent 310 via agent interface 120.

Once the response has been converted to the common format, messaging platform 110 then invokes post-processing logic 260 to process the converted response. As explained, post-processing logic 260 may verify that the user represented in the messaging session 115 is the same user that authenticated at endpoint system 150. If the authentication is valid, messaging platform 110 commits an updated verification status by updating the messaging records created previously. Messaging platform 110 updates agent interface 120 to reflect the update to those messaging records to indicate whether the user has authenticated.

Figure 3B:
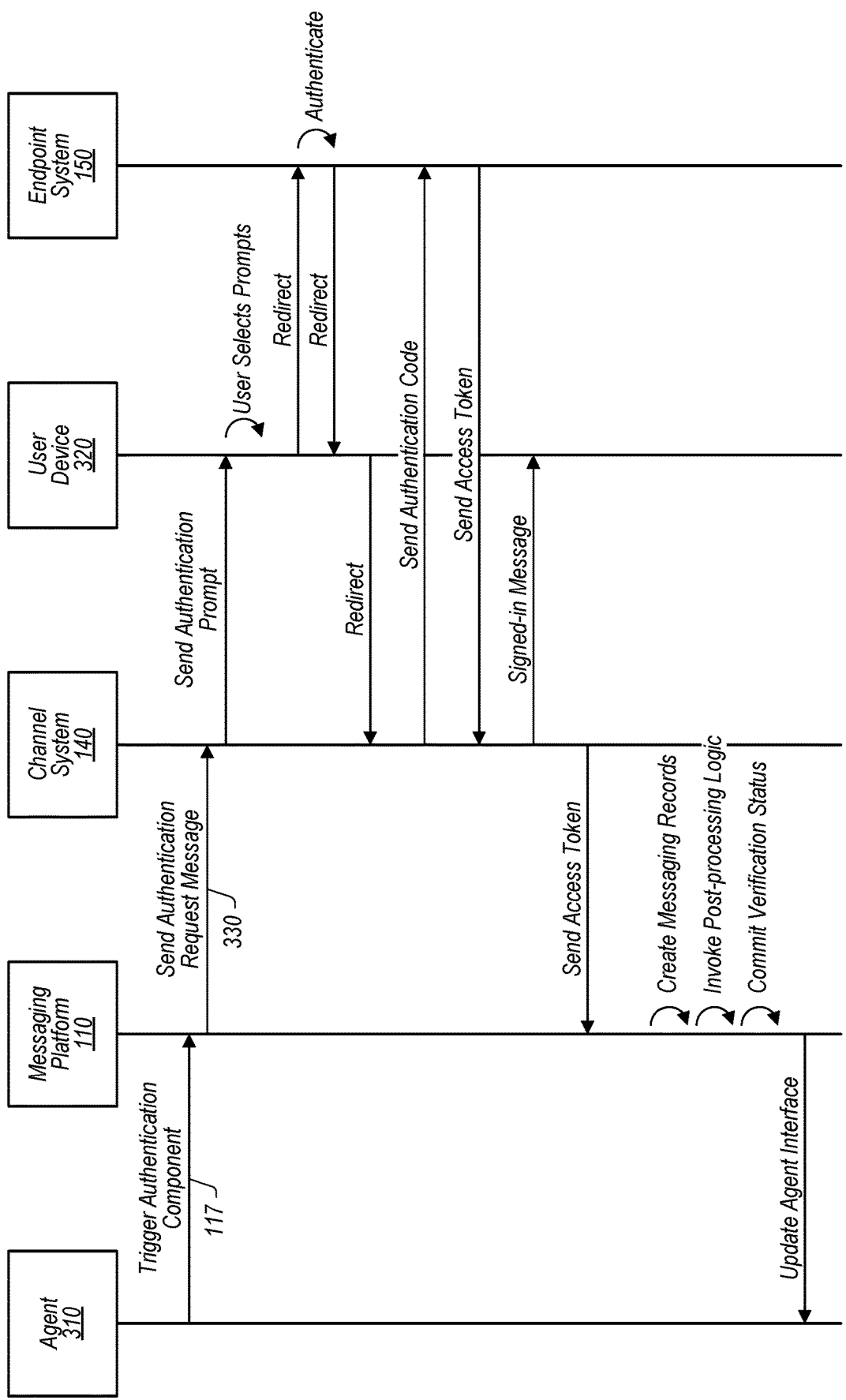

Turning now to FIG. 3B, a block diagram of another example authentication flow is shown. In the illustrated embodiment, there is an agent 310, messaging platform 110, a channel system 140, a user device 320, and an endpoint system 150. The authentication flow presented in FIG. 3B is similar to the authentication flow of FIG. 3A except the authentication flow of FIG. 3B does not involve an encrypted access token that is decrypted by messaging platform 110. This difference may be due to the authentication flows of FIGS. 3A and 3B involving different channel systems 140. In particular, the channel system 140 of FIG. 3B implements a protocol that does not include encrypting the access token received from endpoint system 150 before it is returned to messaging platform 110. Consequently, messaging platform 110 does not have to perform a decryption operation on the token. In some cases, messaging platform 110 might not have to convert the response received from a channel system 140 into the common format as the response may already be in the common format (e.g., a decrypted access token).

Figure 3C:
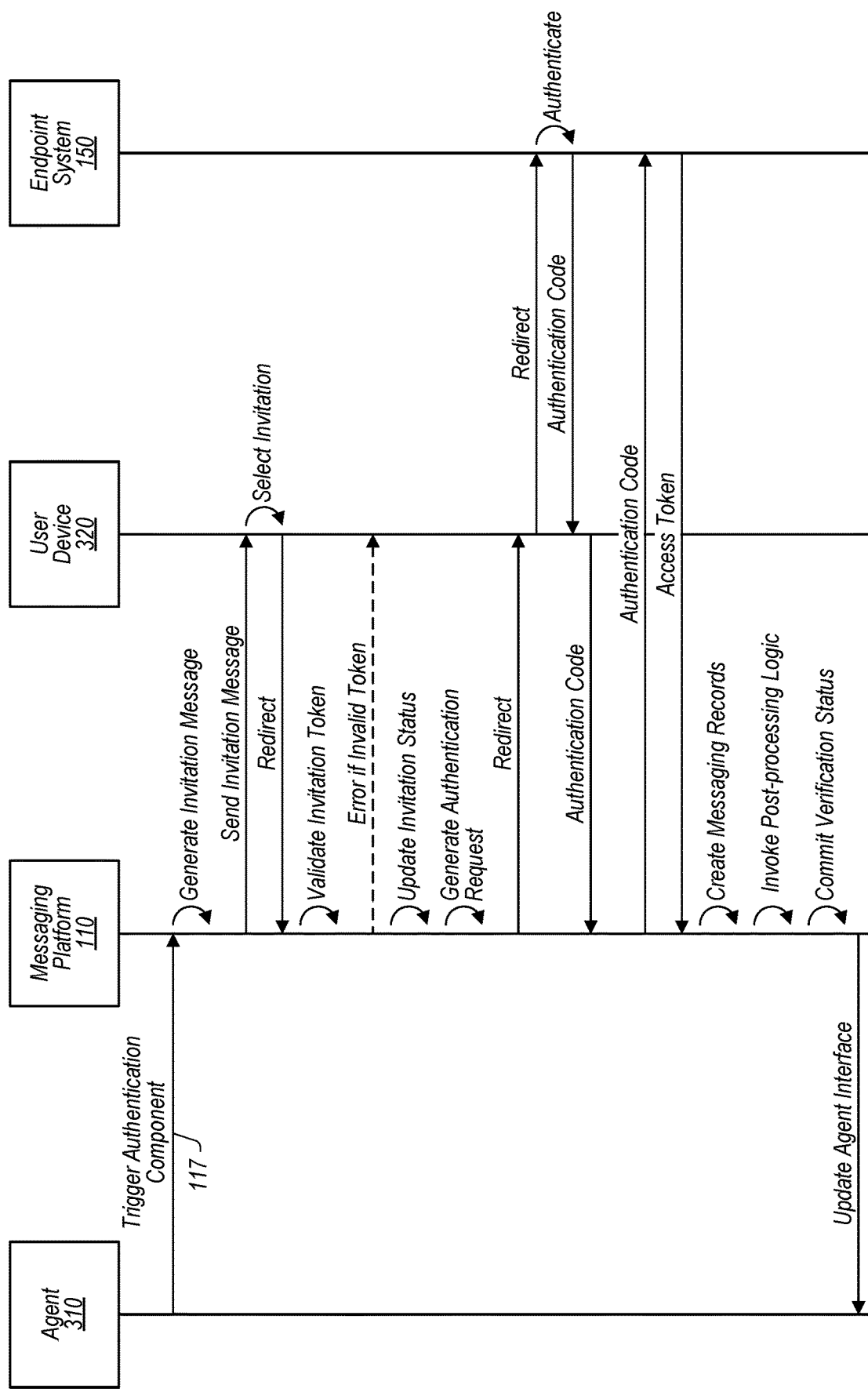

Turning now to FIG. 3C, a block diagram of another authentication flow is shown. In the illustrated embodiment, there is an agent 310, messaging platform 110, a user device 320, and an endpoint system 150. The authentication flow of FIG. 3C may involve the use of SMS or another messaging channel 130 that does not have a feature-rich implementation supported by a channel system 140. As illustrated, agent 310 may trigger authentication component 117, causing a message to be sent to messaging platform 110. In response to the message, messaging platform 110 may generate an invitation message that includes a description (e.g., a title) and a URL. In some embodiments, message platform 110 also creates an authentication invitation record that identifies an invitation token (included in the invitation message) and an expiration date of the invitation. Messaging platform 110 sends the invitation message to user device 320 (e.g., as a text message) and then the user of user device 320 selects the invitation. In response, user device 320 redirects the user to messaging platform 110.

As a part of the redirection, user device 320 provides the invitation token to messaging platform 110. Messaging platform 110 then verifies that the provided invitation token is valid and has not expired. If the token is not valid, then messaging platform 110 returns an error to user device 320. If the token is valid, then messaging platform 110 updates the authentication invitation record to indicate that the user has accepted the invitation. Messaging platform 110 also generates an authentication request having the appropriate information for facilitating the authentication of the user, including a URL to endpoint system 150. Messaging platform 110 provides the authentication request to user device 320 to cause user device 320 to be redirected to endpoint system 150. In response to a successful authentication of the user, an authentication code is returned to messaging platform 110 via user device 320. Messaging platform 110 then provides the authentication code to endpoint system 150 and receives back an access token. After receiving that access token, messaging platform 110 generates the messaging records, invokes post-processing logic 260, and commits an updated verification status, as discussed previously.

Figure 4:
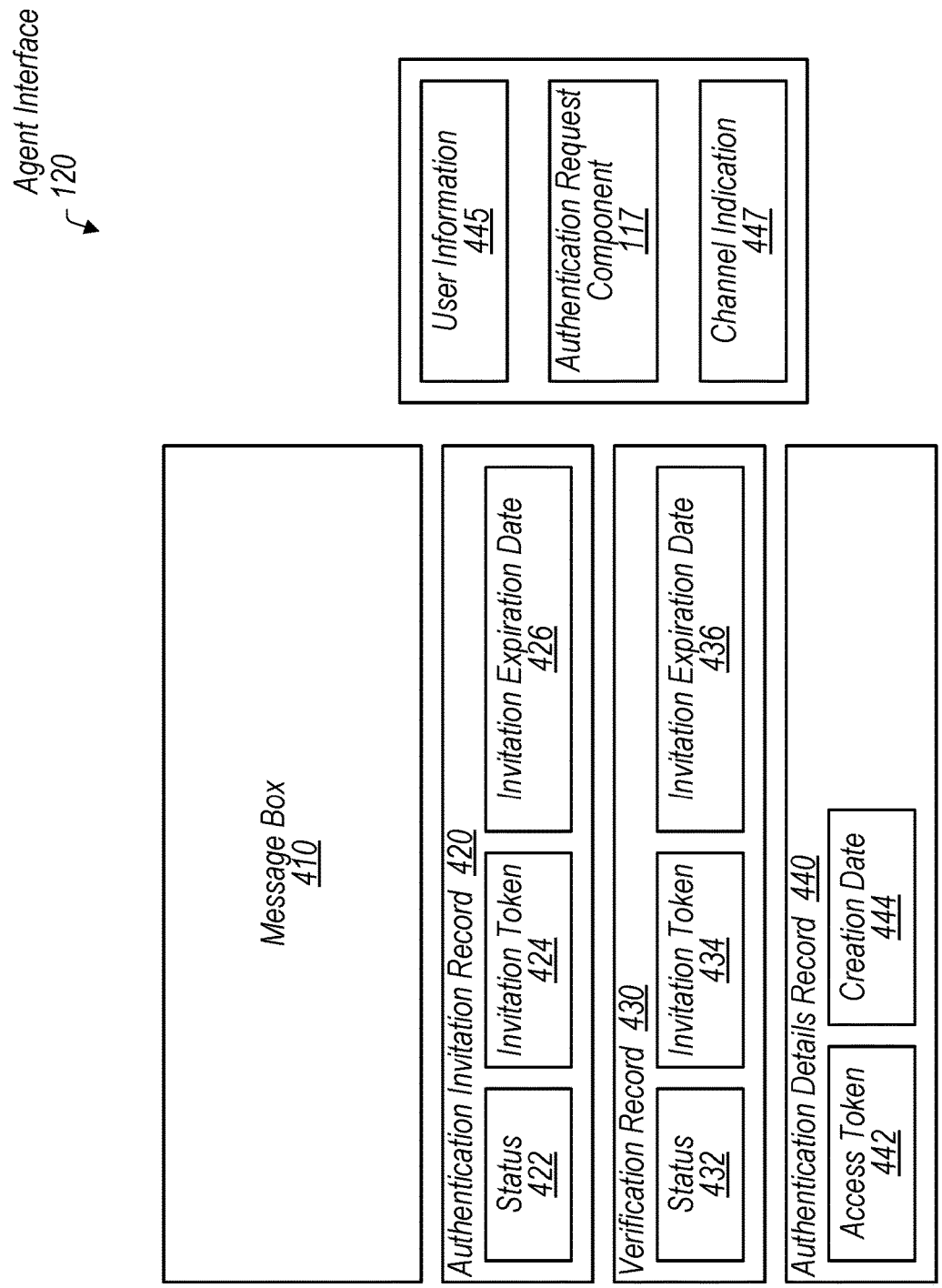
FIG. 4 is a block diagram illustrating an example interface presented to an agent during a messaging session with a user, according to some embodiments.

Turning now to FIG. 4, a block diagram of an example agent interface 120 is shown. In the illustrated embodiment, agent interface 120 presents authentication request component 117, a message box 410, an authentication invitation record 420, a verification record 430, an authentication details record 440, user information 445, and a channel indication 447. In some embodiments, agent interface 120 is implemented differently than shown. For example, agent interface 120 may include multiple tabs for different conversations, a map component, etc.

Message box 410, in various embodiments, is an interface component that can be used to present messages that are sent and received during a messaging session 115 between a user and an agent and to enable that agent to also send messages to that user. When the agent selects authentication request component 117, a representation of the authentication request being sent and delivered to the user may be displayed within message box 410. For example, a symbol or an image may be shown in message box 410. When the user selects that authentication request and is then directed to endpoint system 150, a representation that the user is authenticating (or has authenticated) may be displayed within message box 410. In various embodiments, instead of, or in addition to, these representations being presented within message box 410, the sending of the authentication request and the authentication of the user are presented via authentication invitation record 420 and verification record 430, as shown.

Authentication invitation record 420, in various embodiments, is a record used to track the state of an authentication request. As a result, authentication invitation record 420 may be created when the agent selects authentication request component 117 and bound to the relevant messaging session 115 via a messaging session ID. As shown, authentication invitation record 420 identifies a status 422, an invitation token 424, and an invitation expiration date 426. Status 422, in various embodiments, indicates whether the user has selected the authentication request to begin the authentication process. Invitation token 424, in various embodiments, is a token that is used by the user's device to cause messaging platform 110 to redirect the user's device to endpoint system 150. That is, when a user selects an authentication request, the user's device may submit a request (with invitation token 424) to messaging platform 110 to indicate that the user seeks to authenticate. In response, messaging platform 110 may communicate with the user's device (e.g., through a channel system 140) to route it to endpoint system 150. Invitation expiration date 426, in various embodiments, identifies a date (or a remaining amount of time) at or after which the user will no longer be able to accept that authentication request. At which point, the agent may issue another authentication request to that user.

Verification record 430, in various embodiments, is a record used to track the level of verification of a user. Verification record 430 may be created when the messaging session 115 is established, when the agent selects authentication request component 117, or when the user completes authentication. As with authentication invitation record 420, verification record 430 may be bound to the messaging session 115 via a messaging session ID. As shown, verification record 430 specifies a verification level 434 and a verification expiration date 436. Verification level 434, in various embodiments, identifies the degree to which the user has been verified. A user may transition from a start state (e.g., unidentified/identified) through a set of levels (e.g., verified) to an end state (e.g., authenticated). For example, the messaging channel 130 (or the channel system 140) used by a user may provide information to messaging platform 110 about the user and thus verification level 434 may be set to "identified." If that messaging channel 130 verifies the user via its own verification mechanisms (e.g., the user logs in) and indicates that the user has been verified, then verification level 434 may be set to "verified." While the user being verified may provide greater assurance than simply being identified, the agent may still wish to authenticate the user at endpoint system 150. Once the user has been authenticated, then verification level 434 may be set to "authenticated." Verification expiration date 436, in various embodiments, identifies a date (or a remaining amount of time) at or after which the user's level of verification will be invalid. As such, the agent may issue another authentication request to authenticate the user.

Authentication details record 440, in various embodiments, includes information about authentication elements issued as a part of the authentication process. As shown, authentication details record 440 identifies an access token 442 and a creation date 444. Access token 442, in various embodiments, is a token issued by endpoint system 150 that can be used in requests to endpoint system 150 to show that the user has been authenticated. For example, the agent may access records from endpoint system 150 on behalf of the user by issuing requests with access token 442 to endpoint system 150. Creation date 444, in various embodiments, indicates a date when access token 442 was created. While not depicted, authentication details record 440 may indicate a date when access token 442 expires.

User information 445, in various embodiments, is information about a user that may be helpful to the agent. For example, user information 445 may include a username, preferences of the user, information about previous interactions with the user, etc. Channel indication 447, in various embodiments, indicates the messaging channel 130 that is being used by the user to communicate with the agent. User information 445 and channel indication 447 may be useful in enabling the agent to provide a more user-friendly experience.

Figure 5:
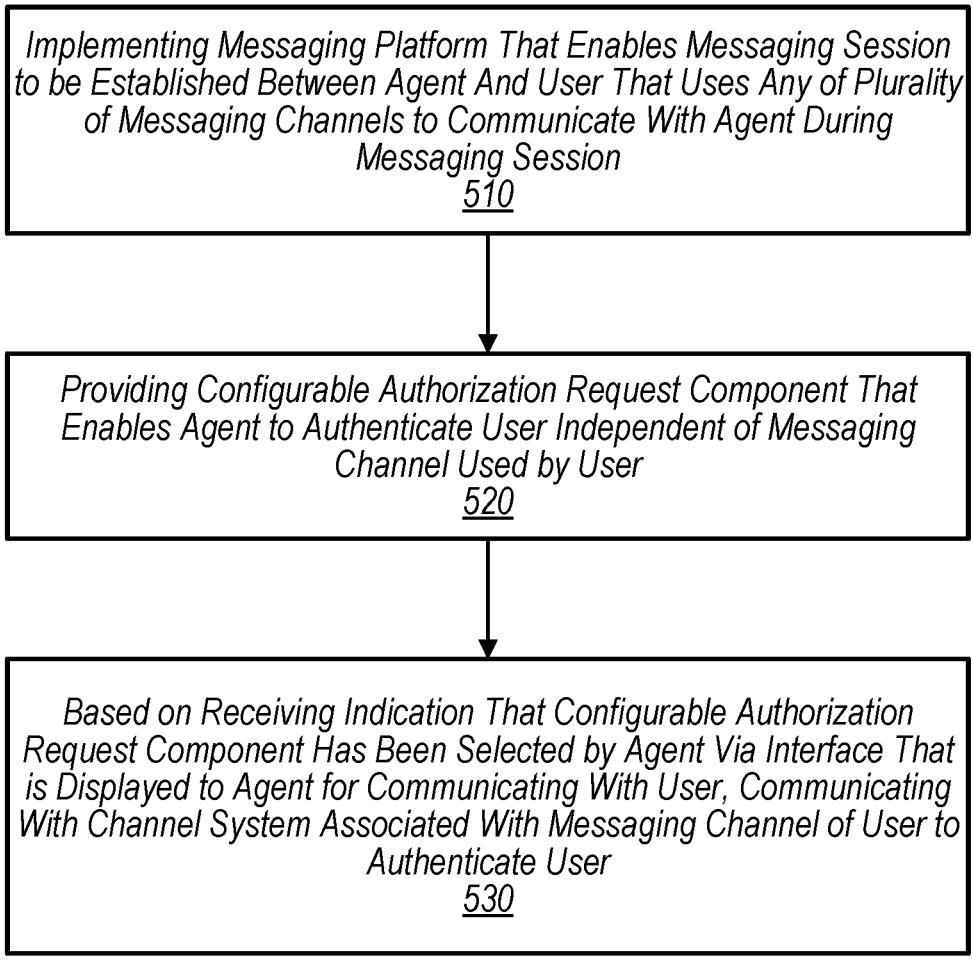
FIG. 5 is a flow diagram illustrating an example method that relates to authenticating a user that uses any one of a plurality of messaging channels for a messaging session, according to some embodiments.

Turning now to FIG. 5, a flow diagram of a method 500 is shown. Method 500 is one embodiment of a method performed by a computer system (e.g., messaging platform 110) to authenticate a user that utilizes any one of a plurality of messaging channels (e.g., messaging channels 130) for a messaging session (e.g., a messaging session 115). Method 500 may be performed by executing program instructions stored on a non-transitory computer-readable medium. In some embodiments, method 500 may include more or less steps than shown. For example, method 500 may include a step in which the computer system maintains multiple configurations for a configurable authorization request component (e.g., authentication request component 117) that are defined by respective tenants hosted by the computer system.

Method 500 begins in step 510 with the computer system implementing a messaging platform (e.g., messaging platform 110) that enables a messaging session to be established between an agent (e.g., an agent 310) and a user that uses any of a plurality of messaging channels to communicate with the agent during the messaging session.

In step 520, the computer system provides a configurable authorization request component that enables the agent to authenticate the user independent of a messaging channel used by the user. The computer system may receive configuration information defining a configuration for the authorization request component. The configuration information may identify a post-processing routine (e.g., post-processing logic 260) provided by a tenant that is hosted by the computer system and associated with the agent. The configuration information may also specify an endpoint system (e.g., an endpoint system 150) where authentication is to occur.

In step 530, based on receiving an indication that the configurable authorization request component has been selected by the agent via an interface (e.g., agent interface 120) that is displayed to the agent for communicating with the user, the computer system communicates with a channel system (e.g., a channel system 140) associated with the messaging channel of the user to authenticate the user. The channel system may be operable to route a user device (e.g., a user device 320) of the user to the endpoint system in response to receiving an authentication request (e.g., an authentication request message 330) from the computer system. The computer system may generate, based on configuration information provided by a tenant when configuring the configurable authorization request component, a first native payload that can be understood by the channel system. The first native payload may be different than a second native payload generated for a different channel system. The computers system may provide the first native payload to the channel system as the authentication request to authenticate the user.

In some embodiments, the computers system sends an authentication request to a user device of the user. Selection of the authentication request may be operable to cause the user device to be routed to the computer system. The computer system may route the user device to the endpoint system for authentication of the user and receive an authentication code from the user device. The computer system may communicate with the endpoint system to exchange the received authentication code for an authentication token.

Subsequent to receiving a response indicating whether the user has been authenticated, the computer system executes the post-processing routine to process the response. The post-processing routine may be executable to verify that the user authenticated as a user linked to the messaging session and not a different user. The computers system may convert at least a portion of the response from a first format to a second format that can be processed by the post-processing routine.

The computer system may cause a set of records (e.g., records 420-440) to be presented to the agent. A first one of the set of records may indicate a verification level of the user and an expiration date of the verification level. The verification level may be any of: unverified, verified by the channel system, and authenticated by an endpoint system associated with the configurable authorization request component. A second one of the set of records may indicate whether the user has accepted an authentication request communicated to a user device of the user and an expiration date of the authentication request. A third one of the set of records may store authentication credentials that include an authentication token having an associated expiration date.

Exemplary Computer System

Figure 6:
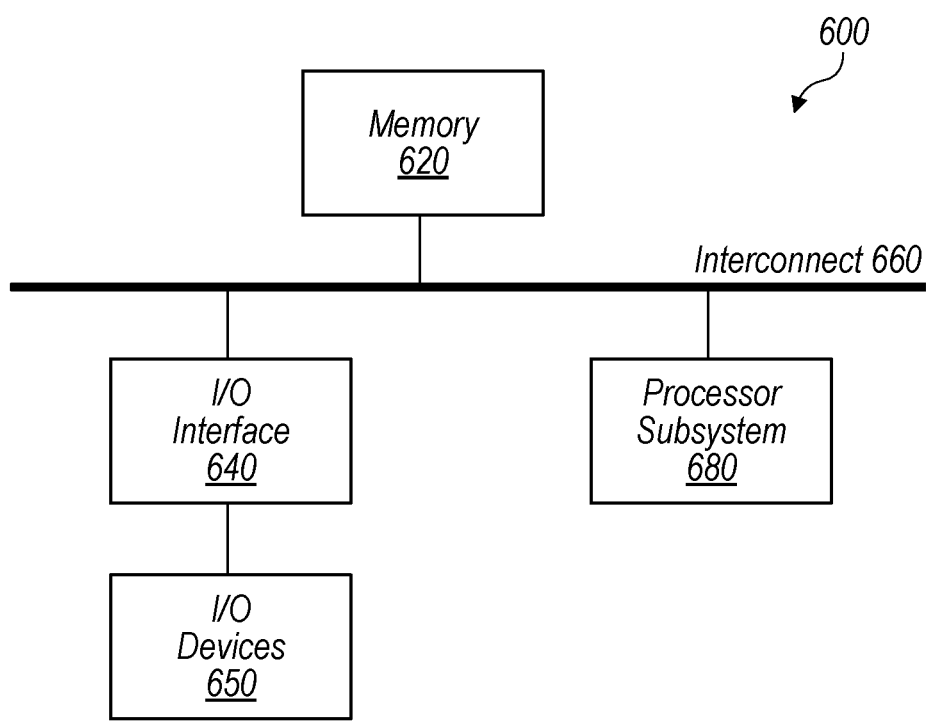
FIG. 6 is a block diagram illustrating elements of a computer system for implementing various systems described in the present disclosure, according to some embodiments.

Turning now to FIG. 6, a block diagram of an exemplary computer system 600, which may implement system 100, messaging platform 110, a channel system 140, a user device 320, or an endpoint system 150, is depicted. Computer system 600 includes a processor subsystem 680 that is coupled to a system memory 620 and I/O interfaces(s) 640 via an interconnect 660 (e.g., a system bus). I/O interface(s) 640 is coupled to one or more I/O devices 650. Although a single computer system 600 is shown in FIG. 6 for convenience, system 600 may also be implemented as two or more computer systems operating together.

Processor subsystem 680 may include one or more processors or processing units. In various embodiments of computer system 600, multiple instances of processor subsystem 680 may be coupled to interconnect 660. In various embodiments, processor subsystem 680 (or each processor unit within 680) may contain a cache or other form of on-board memory.

System memory 620 is usable store program instructions executable by processor subsystem 680 to cause system 600 perform various operations described herein. System memory 620 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 600 is not limited to primary storage such as memory 620. Rather, computer system 600 may also include other forms of storage such as cache memory in processor subsystem 680 and secondary storage on I/O Devices 650 (e.g., a hard drive, storage array, etc.). In some embodiments, these other forms of storage may also store program instructions executable by processor subsystem 680. In some embodiments, program instructions that when executed implement agent interface 120, a messaging channel 130, and a user interface 135, may be included/stored within system memory 620.

I/O interfaces 640 may be any of various types of interfaces configured to couple to and communicate with other devices, according to various embodiments. In one embodiment, I/O interface 640 is a bridge chip (e.g., Southbridge) from a front-side to one or more back-side buses. I/O interfaces 640 may be coupled to one or more I/O devices 650 via one or more corresponding buses or other interfaces. Examples of I/O devices 650 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 600 is coupled to a network via a network interface device 650 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:
    implementing, by a computer system, a messaging platform that enables a messaging session to be established between an agent and a user that uses any of a plurality of messaging channels to communicate with the agent during the messaging session;
    causing, by the computer system, an agent interface to be displayed to the agent that includes a configurable authorization request component that enables the agent to authenticate the user as part of the messaging session independent of a messaging channel used by the user;
    based on receiving an indication that the configurable authorization request component has been selected by the agent via the agent interface that is displayed to the agent for communicating with the user, the computer system communicating with a channel system associated with the messaging channel to route a device of the user to an endpoint authentication system to authenticate the user;

receiving, by the computer system from the channel system, a response generated based on an authentication of the user at the endpoint authentication system; and causing, by the computer system, the agent interface to present, to the agent, an indication of whether the user authenticated.

2. The method of claim 1, further comprising:

receiving, by the computer system, configuration information defining a configuration for the configurable authorization request component, wherein the configuration information identifies a post-processing routine provided by a tenant that is hosted by the computer system and associated with the agent; and subsequent to receiving the response, the computer system executing the post-processing routine to process the response.

3. The method of claim 2, wherein the post-processing routine is executable to verify that the user authenticated as a user linked to the messaging session and not a different user.

4. The method of claim 2, further comprising:

converting, by the computer system, at least a portion of the response from a first format to a second format that can be processed by the post-processing routine.

5. The method of claim 1, further comprising:

receiving, by the computer system, configuration information defining a configuration for the configurable authorization request component, wherein the configuration information specifies the endpoint authentication system where authentication is to occur.

6. The method of claim 1, further comprising:

causing, by the computer system, a set of records to be presented to the agent, wherein a first one of the set of records indicates a verification level of the user and an expiration date of the verification level.

7. The method of claim 6, wherein a second one of the set of records indicates:

whether the user has accepted an authentication request communicated to the device of the user, wherein the authentication request is communicated to the device of the user in response to receiving the indication that the configurable authorization request component has been selected by the agent; and an expiration date of the authentication request.

8. The method of claim 6, wherein a second one of the set of records stores authentication credentials that include an authentication token having an associated expiration date.

9. The method of claim 1, wherein the communicating with the channel system includes:

generating, based on configuration information provided by a tenant when configuring the configurable authorization request component, a first native payload that can be understood by the channel system, wherein the first native payload is different than a second native payload generated for a different channel system; and providing the first native payload to the channel system as an authentication request to authenticate the user.

10. The method of claim 1, further comprising:

maintaining, by the computer system, a plurality of configurations for the configurable authorization request component that are defined by a respective plurality of tenants hosted by the computer system.

11. A non-transitory computer-readable medium having program instructions stored thereon that are executable by a computer system to cause the computer system to perform operations comprising:

implementing a messaging platform that enables a messaging session to be established between an agent and a user that uses any of a plurality of messaging channels to communicate with the agent during the messaging session;

causing an agent interface to be displayed to the agent that includes a configurable authorization request component that enables the agent to authenticate the user as part of the messaging session independent of a messaging channel used by the user;

based on receiving an indication that the configurable authorization request component has been selected by the agent via the agent interface that is displayed to the agent for communicating with the user, communicating with a channel system associated with the messaging channel to route a device of the user to an endpoint authentication system to authenticate the user;

receiving a response generated based on an authentication of the user at the endpoint authentication system; and causing the agent interface to present an indication to the agent of whether the user authenticated.

12. The non-transitory computer-readable medium of claim 11, wherein the communicating with the channel system includes:

sending, to the channel system, an authentication request specifying the endpoint authentication system identified by a tenant of the computer system when configuring the configurable authorization request component.

13. The non-transitory computer-readable medium of claim 11, wherein the operations further comprise:

subsequent to receiving the response:

converting at least a portion of the response into a format that can be processed by a post-processing routine identified, by a tenant associated with the agent, when configuring the configurable authorization request component; and executing the post-processing routine to process the portion of the response.

14. The non-transitory computer-readable medium of claim 11, wherein the indication identifies a verification level of the user, wherein the verification level can be any of: unverified, verified by the channel system, and authenticated by the endpoint authentication system associated with the configurable authorization request component.

15. The non-transitory computer-readable medium of claim 11, wherein the operations further comprise:

based on receiving an indication that the configurable authorization request component has been selected by the agent via the agent interface during another messaging session with a different user, sending an authentication request to a device of the different user, wherein selection of the authentication request is operable to cause the device of the different user to be routed to the computer system, and wherein the operations further comprise:

routing the device of the different user to the authentication endpoint system for authentication of the different user;

receiving an authentication code from the device of the different user; and communicating with the endpoint authentication system to exchange the received authentication code for an authentication token.

16. A system, comprising:

at least one processor; and memory having program instructions stored thereon that are executable by the at least one processor to cause the system to perform operations comprising:

implementing a messaging platform that enables a messaging session to be established between an agent and a user that uses any of a plurality of messaging channels to communicate with the agent during the messaging session;

causing an agent interface to be displayed to the agent that includes a configurable authorization request component that enables the agent to authenticate the user as part of the messaging session independent of a messaging channel used by the user;

based on receiving an indication that the configurable authorization request component has been selected by the agent via the agent interface that is displayed to the agent for communicating with the user, communicating with a channel system associated with the messaging channel to route a device of the user to an endpoint authentication system to authenticate the user;

receiving, from the channel system, a response generated based on an authentication of the user at the endpoint authentication system; and causing the agent interface to present an indication to the agent of whether the user authenticated.

17. The system of claim 16, wherein the operations further comprise:

executing a post-processing routine to verify whether the user authenticated as a user linked to the messaging session and not a different user.

18. The system of claim 17, wherein the response includes an encrypted access token, and wherein the operations further comprise:

before executing the post-processing routine, decrypting the encrypted access token to generate a decrypted form of the access token that is processable by the post-processing routine.

19. The system of claim 16, wherein the operations further comprise:

causing a set of records to be presented to the agent, wherein one of the set of records indicates a verification level of the user and an expiration date of the verification level.

20. The system of claim 16, wherein the communicating with the channel system includes:

sending, to the channel system, an authentication request specifying a uniform resource locator (URL) of the endpoint authentication system capable of authenticating the user, wherein the channel system is operable to:

route the device of the user to the endpoint authentication system based on the URL;

obtain an authentication code from the endpoint authentication system via the device;

exchange the authentication code for an access token, wherein the access token permits access to one or more resources of the endpoint authentication system; and return the access token to the messaging platform.

* * * * *